United States Patent
Stork et al.

(10) Patent No.: US 9,494,145 B2
(45) Date of Patent: Nov. 15, 2016

(54) ELECTRIC MOTOR

(75) Inventors: Gerald Stork, Bielefeld (DE); Wieland Schaefer, Schloss Holte-Stukenbrock (DE); Hans Teuber, Oerlinghausen (DE); Erol Bernstein, Bielefeld (DE)

(73) Assignee: HANNING ELEKTRO-WERKE GmbH & Co. KG, Oerlinghausen (DE)

( * ) Notice: Subject to any disclaimer, the term of this patent is extended or adjusted under 35 U.S.C. 154(b) by 297 days.

(21) Appl. No.: 14/131,242

(22) PCT Filed: Jul. 8, 2011

(86) PCT No.: PCT/DE2011/001437
§ 371 (c)(1),
(2), (4) Date: Jan. 7, 2014

(87) PCT Pub. No.: WO2013/007225
PCT Pub. Date: Jan. 17, 2013

(65) Prior Publication Data
US 2014/0140872 A1    May 22, 2014

(51) Int. Cl.
| | | |
|---|---|---|
| *H02K 9/14* | (2006.01) | |
| *F04B 17/03* | (2006.01) | |
| *H02K 5/20* | (2006.01) | |
| *H02K 9/06* | (2006.01) | |
| *H02K 5/18* | (2006.01) | |
| *H02K 5/22* | (2006.01) | |

(52) U.S. Cl.
CPC .................. *F04B 17/03* (2013.01); *H02K 5/20* (2013.01); *H02K 9/06* (2013.01); *H02K 5/18* (2013.01); *H02K 5/225* (2013.01); *H02K 9/14* (2013.01)

(58) Field of Classification Search
CPC ...... H02K 9/14; H02K 5/15; H02K 11/0073; H02K 5/04; H02K 5/16; H02K 5/132; H02K 5/225; H02K 9/06; H02K 9/23; H02K 9/00; H02K 9/19; H02K 9/12
USPC ......................................... 310/52, 58, 59, 54
See application file for complete search history.

(56) References Cited

U.S. PATENT DOCUMENTS 4,992,687 A * 2/1991 Nel ...................... H02K 11/048
219/133
6,123,158 A    9/2000 Steffen
(Continued)

FOREIGN PATENT DOCUMENTS

| CN | 101865146 A | 10/2010 | |
|---|---|---|---|
| DE | GB 2220800 A * | 1/1990 | ............. F04D 13/06 |

(Continued)

OTHER PUBLICATIONS

JP 02119549 A machine translation Dec. 28, 2015.*
(Continued)

*Primary Examiner* — Hanh Nguyen
*Assistant Examiner* — Leda Pham
(74) *Attorney, Agent, or Firm* — Patent Central LLC; Stephen A. Pendorf

(57) ABSTRACT

An electric motor with a casing in which a stator in coaxial arrangement with the motor shaft and a rotor are disposed, and a terminal box which is attached to a casing peripheral wall and in which electronic components are arranged. Between the terminal box and the casing a breakthrough is provided on the one hand and an auxiliary impeller firmly connected to the motor shaft is mounted inside the motor casing on the other hand such that an air stream can flow from the interior of the casing into the interior of the terminal box and/or vice versa when the electric motor is operating.

12 Claims, 3 Drawing Sheets

(56) References Cited

U.S. PATENT DOCUMENTS

| | | | | |
|---|---|---|---|---|
| 8,506,264 B2 * | 8/2013 | Horng | ................ | F04D 25/0606 310/52 |
| 2009/0267432 A1 * | 10/2009 | Henry | ................... | H02K 5/225 310/71 |
| 2010/0254826 A1 | 10/2010 | Streng et al. | | |
| 2012/0039729 A1 * | 2/2012 | Horng | ................ | F04D 25/0606 417/410.1 |

FOREIGN PATENT DOCUMENTS

| | | |
|---|---|---|
| DE | 19631517 A1 | 2/1998 |
| DE | 10339585 A1 | 3/2005 |
| DE | 102004031399 A1 | 2/2006 |
| DE | 102004033745 B4 | 8/2006 |
| DE | 102008028622 A1 | 12/2009 |
| EP | 2236838 A1 | 10/2010 |
| JP | 61073542 A | 4/1986 |
| JP | 02119549 A * | 5/1990 |
| JP | 2119549 A | 5/1990 |
| JP | 3222652 A | 10/1991 |

OTHER PUBLICATIONS

International Search Report dated May 2, 2012, in International Application No. PCT/DE2011/001437.

English language translation of Chinese Office Action dated Sep. 22, 2015, in Chinese Application No. 201180072163.5.

* cited by examiner

ELECTRIC MOTOR

This present invention relates to an electric motor comprising a casing in which a stator in coaxial arrangement with a motor shaft and a rotor are disposed, and a terminal box which is attached to a casing peripheral wall and in which electronic components are mounted.

Prior known from DE 10 2004 033 745 B 4 is an electric motor comprising a casing and a terminal box attached to a peripheral wall thereof to accommodate electric components. To permit the heat from said electric components to be dissipated to the ambience a bottom member of the terminal box that is facing the casing is thermally conductive. A drawback affecting said prior art electric motor resides in that the dissipation of heat produced by the power electronic components disposed inside the terminal box is relatively sluggish because said components are not direct cooled by the air stream.

DE 10 2004 031 399 A1 is disclosing an electric motor with a casing in which in addition to a motor shaft, a stator and a rotor there are electric components for a frequency converter integrated in a barrel shaped B-side bearing bracket also. To permit additional cooling of these electric components there is an auxiliary fan disposed in a coaxial relation with the motor shaft between stator and rotor on one side and the electric components on the other. This permits additional cooling of the electric components arranged inside the motor casing.

Prior known from DE 103 39 585 A1 is an electric motor with a casing in which a stator, a rotor and a motor shaft are arranged. A terminal box is attached to the periphery of said casing in which electric components for a frequency converter are fitted. To dissipate heat from the electric components disposed inside the terminal box there are air baffles provided in a peripheral area of the casing between said casing and the terminal box such that an air stream generated by a fan is deflected by said baffles across cooling ribs of the casing and passed on to cooling ribs of the terminal box. A drawback of this prior known electric motor is that heat dissipation from the electric components disposed inside the terminal box is just by cooling the terminal box and not the components as such.

It is an object of this present invention to improve an electric motor with a casing and a terminal box attached to said motor casing and accommodating electric components in such a way that dissipation of heat from the electric components disposed inside the motor terminal box will be improved.

To achieve this object the invention is in conjunction with the preamble of claim 1 characterized in that on the one hand there is at least one breakthrough provided between the terminal box and the casing and that on the other hand there is an auxiliary fan impeller firmly connected to the motor shaft inside the casing such that in operation of the electric motor an air stream can flow from inside the casing into the terminal box and/or vice versa.

The invention provides for at least one breakthrough between the terminal box housing electric components and the casing of the electric motor through which an air stream generated by an auxiliary fan disposed inside the casing of the electric motor can flow into and/or out of the terminal box. The heat generated by the electric components inside the terminal box is preferably dissipated direct by an air stream that enters the terminal box, flows around the electric components and then leaves the casing again. This direct sweep around said electric components permits the heat to be removed from the terminal box relatively quickly and efficiently.

A preferred embodiment of this invention provides for an auxiliary fan impeller to be arranged in a radial plane common with the breakthrough to generate the air stream for cooling the electric components inside the terminal box. This means that the auxiliary fan impeller is in alignment with the breakthrough such that a radial air stream can be generated which substantially serves to cool the electric components disposed inside the terminal box.

According to a further modification of the invention there is a board fitted between the auxiliary fan impeller and a B-bracket side face end of the motor casing which serves as an additional baffle face for the air stream. The air stream can be directed into and/or out of the terminal box in a controlled mode this way.

According to a further modification has the breakthrough a first opening for the air stream to flow from the casing into the terminal box and a second opening for said stream to get from the terminal box into the motor casing. Since the auxiliary fan impeller is continuously rotating and radially offset relative to the breakthrough openings there is an increased pressure generated at the first breakthrough opening and a relatively low pressure at the second breakthrough opening. It is due to this pressure difference that continuous ventilation of the interior of the terminal box is achieved.

A still further modification of the invention provides for the first and the second of the breakthrough openings to be arranged in the very radial plane in which the auxiliary fan impeller and/or a separating disk also are arranged. This means that a radial air stream from the motor casing into the terminal box and from the terminal box into the motor casing prevails in a junction area between terminal box and casing.

In another modification of this present invention is the separating disk provided with nose members each assigned to one of the breakthrough openings which protrude into the respective breakthrough openings. This affords the advantage of a better flow control of the air stream from the motor casing into the terminal box and vice versa.

According to still another modification the separating disk is in the form of a circuit board on the first and/or the second flat side of which electrically contacted components are arranged. It is an advantage that the air stream produced by the auxiliary fan impeller cannot only cool the components inside the terminal box, but also those disposed in a radial plane inside the motor casing.

According to one further modification of this invention the auxiliary fan impeller is provided with a plurality of straight radial webs to form fan blades on one of the flat sides which coact with an optical sensor to detect the speed of the electric motor. The radial webs having a color different from that of the flat side may for instance coact with a light barrier. This affords the advantage that a measuring system for speed detection can be integrated into the motor casing in a space saving manner.

Still another modification of the invention provides for the casing to be provided with a B-bearing bracket in which a main fan impeller connected to the motor shaft is arranged. This offers the advantage that self-ventilation of the electric motor can be achieved. The air stream produced by said main fan impeller flows in a substantially axial direction and exclusively serves for cooling components disposed inside the motor casing.

Further advantages of the invention are as disclosed in the subclaims.

One exemplary embodiment of the invention will now be described in closer detail with reference to the accompanying drawings.

Figure 1:
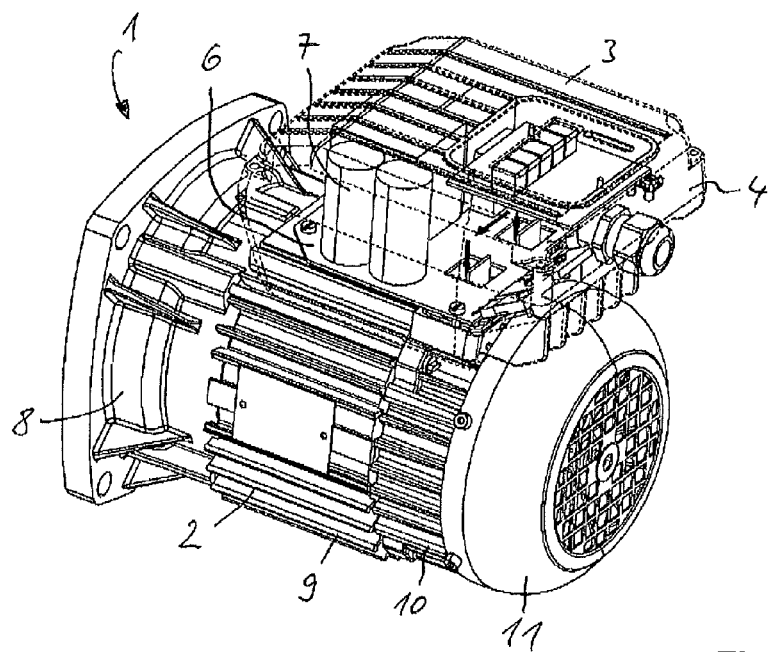
FIG. 1 is a perspective view of an electric motor with a casing and a terminal box on top of said latter.

An electric motor 1 may for instance be a synchronous motor comprising a casing 2 and a terminal box 3 that is connected to the upper part of a peripheral wall of the casing 2 in a positive and coalescent mode. The terminal box 3 has a barrel-shaped wall configuration within which a circuit board 6 fitted with electronic components 7 extends parallel to a motor shaft 5. Said components 7 disposed on said circuit board 6 may form a mains input voltage circuit arrangement and/or a rectifier.

The casing 2 of the electric motor 1 has an A bearing bracket, a center part 9, a B bearing bracket 10 and a fan hood 11 which are all arranged in tandem in axial direction and coaxial to one another. A motor shaft 5 is arranged inside said casing 2 while in the area of the casing center part 9 a stator and a rotor, in the area of the fan hood 11 a main fan impeller 13 and in the area of the B-bearing bracket 10 an auxiliary fan impeller 14 and a separating disk 15 are fitted.

The auxiliary fan impeller 14 is non-rotatably connected to the motor shaft 5 and serves to generate an air stream L which is passed from the interior of the motor casing 2 to the interior of the terminal box 3 and from there back to the interior of the motor casing 2 via a breakthrough 16 to permit the heat due to losses from the electric components 7 inside the terminal box 3 can be passed out to the ambience via the motor casing 2. Heat accumulations inside the terminal box that would detrimentally affect the service life of the electronic components 7 can be avoided this way.

Figure 4:
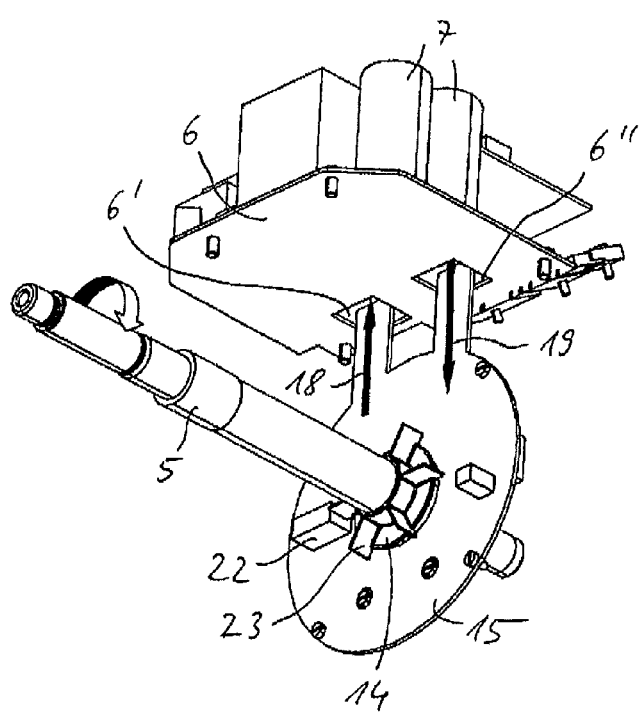
FIG. 4 is a perspective representation of components provided for cooling the terminal box.
Figure 2:
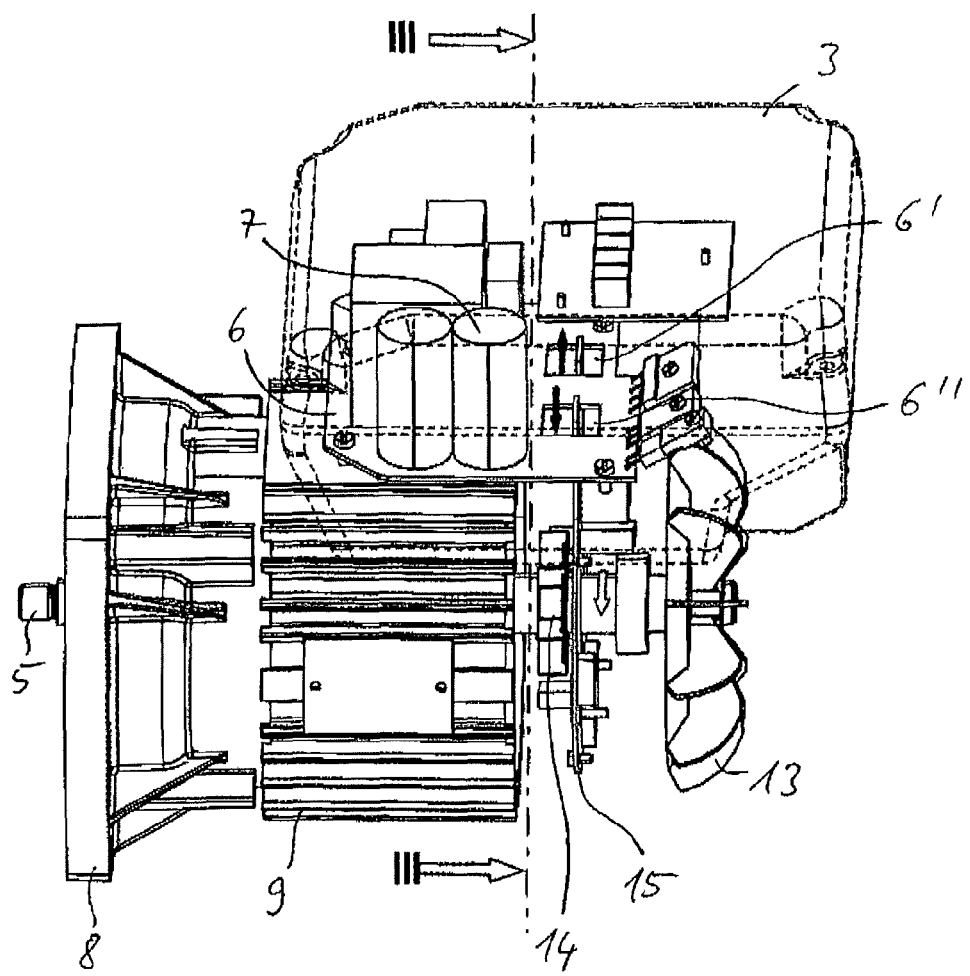
FIG. 2 is a perspective view of said electric motor without a B-bearing bracket as viewed askew from above and with the terminal box shown in dashline representation.
Figure 3:
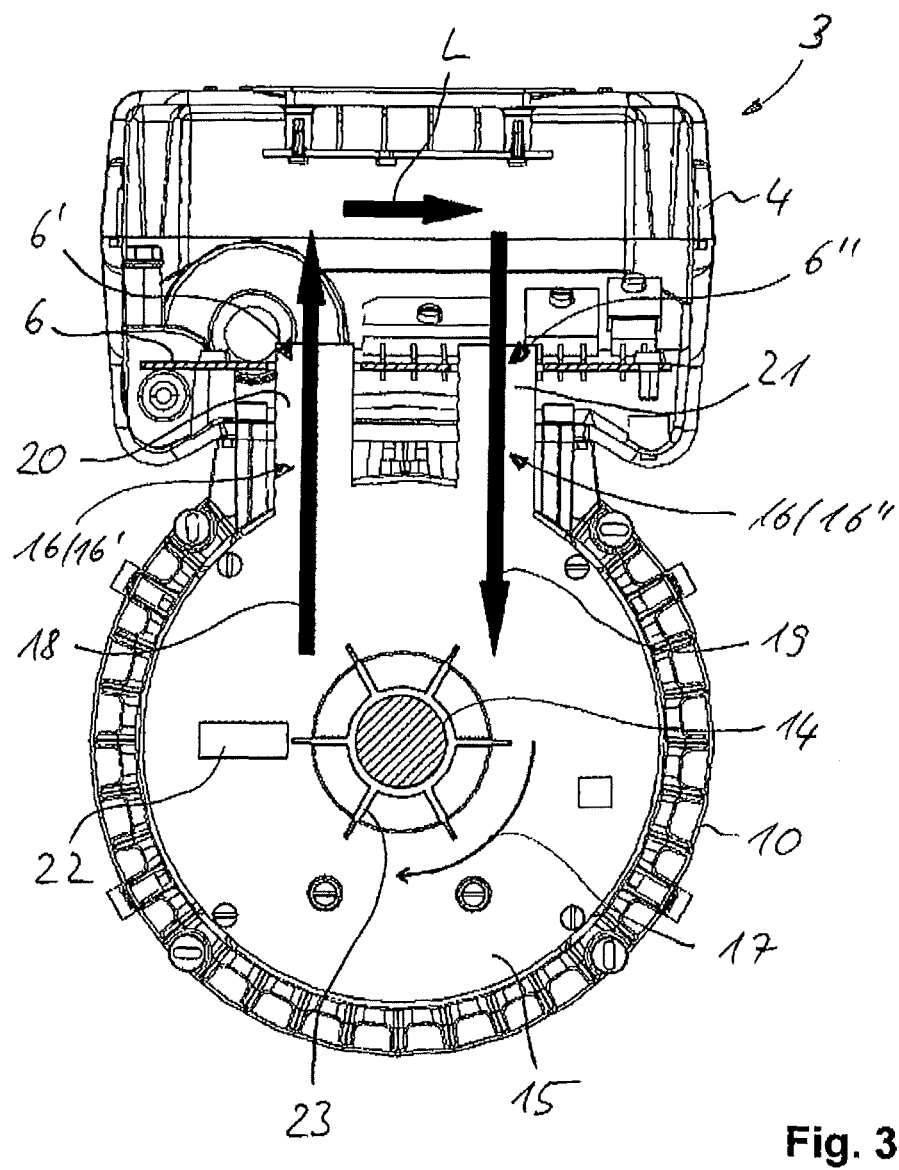
FIG. 3 is a vertical section through the electric motor along section line III-III in FIG. 2.

As will be seen from FIGS. 3 and 4 the breakthrough 16 comprises a first opening 16' and a second opening 16" disposed in one common radial plane. Rotation of the auxiliary fan impeller 14 in arrow direction 17 generates an increased pressure in the area of the first breakthrough opening 16' and a reduced pressure in the area of the second opening 16" such that part of the air stream L in the arrow direction 18 passed into the interior of the terminal box 3 and another part of said stream L in the arrow direction 19 from the interior of the terminal box 3 into the motor casing 2. A direct air sweep around the electric components 7 takes place inside the terminal box 3 which increases heat dissipation efficiency.

The separating disk 15 mounted on the B bearing bracket 10 is of circular shape and extends cross to the motor shaft 5 with its outer diameter being a little smaller than an inner diameter of the B-bearing bracket 10. This means that there is a substantially complete separation from a face end of the B-bearing bracket 10 which the fan hood 11 adjoins in axial direction. The separating disk 15 confines a shaft and/or radial plane in which the auxiliary fan impeller 14 and the breakthrough 16 with both of its openings 16' and 16" in the same radial plane are extending.

The separating disk 15 is on its side facing the breakthrough 16 provided with a first nose member 20 and a second nose member 21 which first nose member 20 protrudes into the first breakthrough opening 16' and the second nose member 21 into the second opening 16". In this present exemplary embodiment, the first nose member 20 and the second nose member 21 of the separating disk 15 extend right into a first breakthrough opening 6' and/or second breakthrough opening 6" via the breakthrough opening of the casing 2 and the terminal box 3. This affords the advantage that a substantially laminar flow is achieved along the arrows 18, 19.

The separating disk 15 is of circuit type having two flat sides and a plurality of electric components 22 on its flat side facing the auxiliary fan impeller 14. These components 22 may for instance form an intermediate circuit and an inverter to activate the electric motor 1. It is an advantage that said electric components 22 disposed inside the motor casing 2 also can be ventilated by said air stream L.

The auxiliary fan impeller 14 is provided with blades in the form of straight radial webs 23 which on the one hand serve to generate the air stream L and on the other hand to detect the speed of the electric motor 1 in coaction with a not-shown optical sensor. This optical sensor is disposed in an axial relation to and aligned with the radial webs 23 which while different in contrast from the background are detected by the optical sensor as a function of speed.

According to a not-shown alternative embodiment of the invention it is possible to provide more than just two breakthrough openings 16', 16". The radial plane in which the breakthrough 16 is disposed is preferably in the form of a shaft which in an axial direction is confined by separating disks 15 on the one side and by the stator and rotor on the other side.

Another alternative embodiment of this invention provides for the separating disk 15 to be non-rotatably connected to the motor shaft 12 also in which case there are no nose members 20, 21 protruding into the breakthrough openings 16', 16" of the motor casing 2 and/or terminal box 3.

The invention claimed is:

1. An electric motor comprising:
    a casing in which a stator in coaxial arrangement with a motor shaft and a rotor are disposed, and
    a terminal box which is attached to a casing peripheral wall and in which electronic components are fitted,
    wherein on the one hand at least first and second breakthrough openings (16', 16") are provided between the terminal box (3) and the casing (2) and on the other hand an auxiliary fan impeller (14) firmly connected to the motor shaft (5) is fitted such that an air stream (L) can flow from inside the casing (2) into the interior of the terminal box (3) and vice verse when the electric motor is operating, and
    wherein a separating disk (15) is provided with first and second nose members (20, 21) pointing in the same direction of which the first nose member (20) protrudes into the first breakthrough opening (16') of the casing (2) and/or the second nose member (21) into the second breakthrough opening (16") of the casing (2) and/or the terminal box (3).

2. The electric motor according to claim 1, wherein the auxiliary fan impeller (14) and the first and second breakthrough openings (16', 16") are disposed in one common radial plane.

3. The electric motor according to claim 1, wherein the casing (2) is provided with a B-bearing bracket (10), and wherein a rigid separating disk (15) is arranged between the auxiliary fan impeller (14) and a B-bracket side face end of the casing (2).

4. The electric motor according to claim 1, wherein the first opening (16') allows the air stream (L) to flow from the casing (2) into the terminal box (3) and the second opening (16") allows said air stream (L) to flow from the terminal box (3) into the casing (3).

5. The electric motor according to claim 4, wherein the first breakthrough opening (16') and the second breakthrough opening (16") extend in one common radial plane.

6. The electric motor according to claim 1, wherein the first nose member (20) and the second nose member (21) of the separating disk (15) extend at least up to a breakthrough opening (6', 6") of a circuit board (6) of the terminal box (3) that carries the electric components (7).

7. The electric motor according to claim 1, wherein the separating disk (15) is in the form of a circuit board on a first and/or second flat side of which electric components (22) in electrical contact.

8. The electric motor according to claim 1, wherein the separating disk (15) is of circular shape.

9. The electric motor according to claim 1, wherein the auxiliary fan impeller (14) has fan blades in the form of straight radial webs (23) which coact with an optical sensor to detect the speed of the electric motor (1).

10. The electric motor according to claim 1, wherein the casing (2) is provided with a B-bearing bracket (10) and an axially adjoining fan hood (11) through which latter a main fan impeller (13) ventilates the components (22) disposed inside the casing (2).

11. The electric motor according to claim 1, wherein the terminal box (3) is attached to the casing (2) in a positive or coalescent mode.

12. The electric motor according to claim 1, wherein the electric components (7) disposed inside the terminal box (3) form a main voltage input circuit arrangement and/or a rectifier.

* * * * *